US012755605B2

(12) United States Patent
Froy et al.

(10) Patent No.: US 12,755,605 B2
(45) Date of Patent: Oct. 6, 2026

(54) CROSS-CHANNEL WAGERING GAME TOURNAMENTS

(71) Applicant: IGT, Las Vegas, NV (US)

(72) Inventors: David Froy, Lakeville-Westmorland (CA); Gaurav Jariwala, Halifax (CA); Fayez Idris, Dieppe (CA); Karen Van Niekerk, Dieppe (CA); Bethany Plimmer, Lower Coverdale (CA); David Small, Moncton (CA); Todd Grimm, Riverview (CA); Michael Russ, Graz (AT)

(73) Assignee: IGT, Las Vegas, NV (US)

( * ) Notice: Subject to any disclaimer, the term of this patent is extended or adjusted under 35 U.S.C. 154(b) by 237 days.

(21) Appl. No.: 18/587,810

(22) Filed: Feb. 26, 2024

(65) Prior Publication Data

US 2025/0273040 A1 Aug. 28, 2025

(51) Int. Cl.
*G07F 17/32* (2006.01)

(52) U.S. Cl.
CPC ...... *G07F 17/3225* (2013.01); *G07F 17/3267* (2013.01); *G07F 17/3276* (2013.01)

(58) Field of Classification Search
None
See application file for complete search history.

(56) References Cited

U.S. PATENT DOCUMENTS

| | | | | |
|---|---|---|---|---|
| 2004/0229700 A1* | 11/2004 | Cannon | G07F 17/3267 | 463/42 |
| 2007/0293293 A1* | 12/2007 | Baerlocher | G07F 17/3211 | 463/16 |
| 2009/0104965 A1* | 4/2009 | House | G06Q 20/3674 | 463/20 |
| 2010/0113162 A1* | 5/2010 | Vemuri | G07F 17/3267 | 463/43 |
| 2013/0065693 A1* | 3/2013 | Johnson | G07F 17/3276 | 463/42 |
| 2013/0344947 A1* | 12/2013 | Cannon | G07F 17/3211 | 463/25 |
| 2014/0179390 A1* | 6/2014 | Kelly | G07F 17/3244 | 463/19 |
| 2021/0043043 A1* | 2/2021 | Burns | G07F 17/3276 | |
| 2023/0401932 A1* | 12/2023 | Thomas | G07F 17/3276 | |

* cited by examiner

*Primary Examiner* — Omkar A Deodhar
(74) *Attorney, Agent, or Firm* — Spencer Fane LLP; William M. Kelly

(57) ABSTRACT

A system includes a processor circuit and a memory coupled to the processor circuit. The memory includes machine-readable instructions that cause the processor circuit to receive a first tournament entry for a wagering game tournament from a first gaming device of a first plurality of gaming devices on a first gaming network. The instructions further cause the processor circuit to receive a second tournament entry for the wagering game tournament from a second gaming device of a second plurality of gaming devices on a second gaming network different from the first gaming network. A game result is determined for the wagering game tournament based on the first tournament entry and the second tournament entry and, in response to the game result being a winning game result, a game award is provided to a player associated with the winning game result.

20 Claims, 11 Drawing Sheets

CROSS-CHANNEL WAGERING GAME TOURNAMENTS

BACKGROUND

Embodiments described herein relate to wagering game tournaments, and in particular to providing wagering game tournaments employing multiple wagering game channels and environments, and related devices, systems, and methods. As the provision of wagering games across multiple channels, such as land-based casinos, video lottery terminals, and personal computing devices, becomes more widespread, the markets for different games and experiences are becoming more fragmented and isolated from each other. There is a need to address these and other technical problems with unique technical solutions that to provide a more integrated, familiar, and consistent experience for users across different channels to increase and enhance enjoyment.

BRIEF SUMMARY

According to some embodiments, a system includes a processor circuit and a memory coupled to the processor circuit. The memory includes machine-readable instructions that, when executed by the processor circuit, cause the processor circuit to receive a first tournament entry for a wagering game tournament from a first gaming device of a first plurality of gaming devices on a first gaming network. The instructions further cause the processor circuit to receive a second tournament entry for the wagering game tournament from a second gaming device of a second plurality of gaming devices on a second gaming network different from the first gaming network. The instructions further cause the processor circuit to determine a game result for the wagering game tournament based on the first tournament entry and the second tournament entry. The instructions further cause the processor circuit to, in response to the game result being a winning game result, provide a game award to a player associated with the winning game result.

According to some embodiments, a system includes a first plurality of gaming devices on a first gaming network, a second plurality of gaming devices on a second gaming network different from the first gaming network, a processor circuit, and a memory coupled to the processor circuit. The memory includes machine-readable instructions that, when executed by the processor circuit, cause the processor circuit to receive a first tournament entry for a wagering game tournament from a first gaming device of the first plurality of gaming devices. The instructions further cause the processor circuit to receive a second tournament entry for the wagering game tournament from a second gaming device of the second plurality of gaming devices. The instructions further cause the processor circuit to determine a game result for the wagering game tournament based on the first tournament entry and the second tournament entry. The instructions further cause the processor circuit to, in response to the game result being a winning game result, provide a game award to a player associated with the winning game result.

According to some embodiments, a method includes receiving, by a processor circuit, a first tournament entry for a wagering game tournament from a first gaming device of a first plurality of gaming devices on a first gaming network. The method further includes receiving, by the processor circuit, a second tournament entry for the wagering game tournament from a second gaming device of a second plurality of gaming devices on a second gaming network different from the first gaming network. The method further includes determining, by the processor circuit, a game result for the wagering game tournament based on the first tournament entry and the second tournament entry. The method further includes, in response to the game result being a winning game result, providing, by the processor circuit, a game award to a player associated with the winning game result.

DETAILED DESCRIPTION

Figure 1:
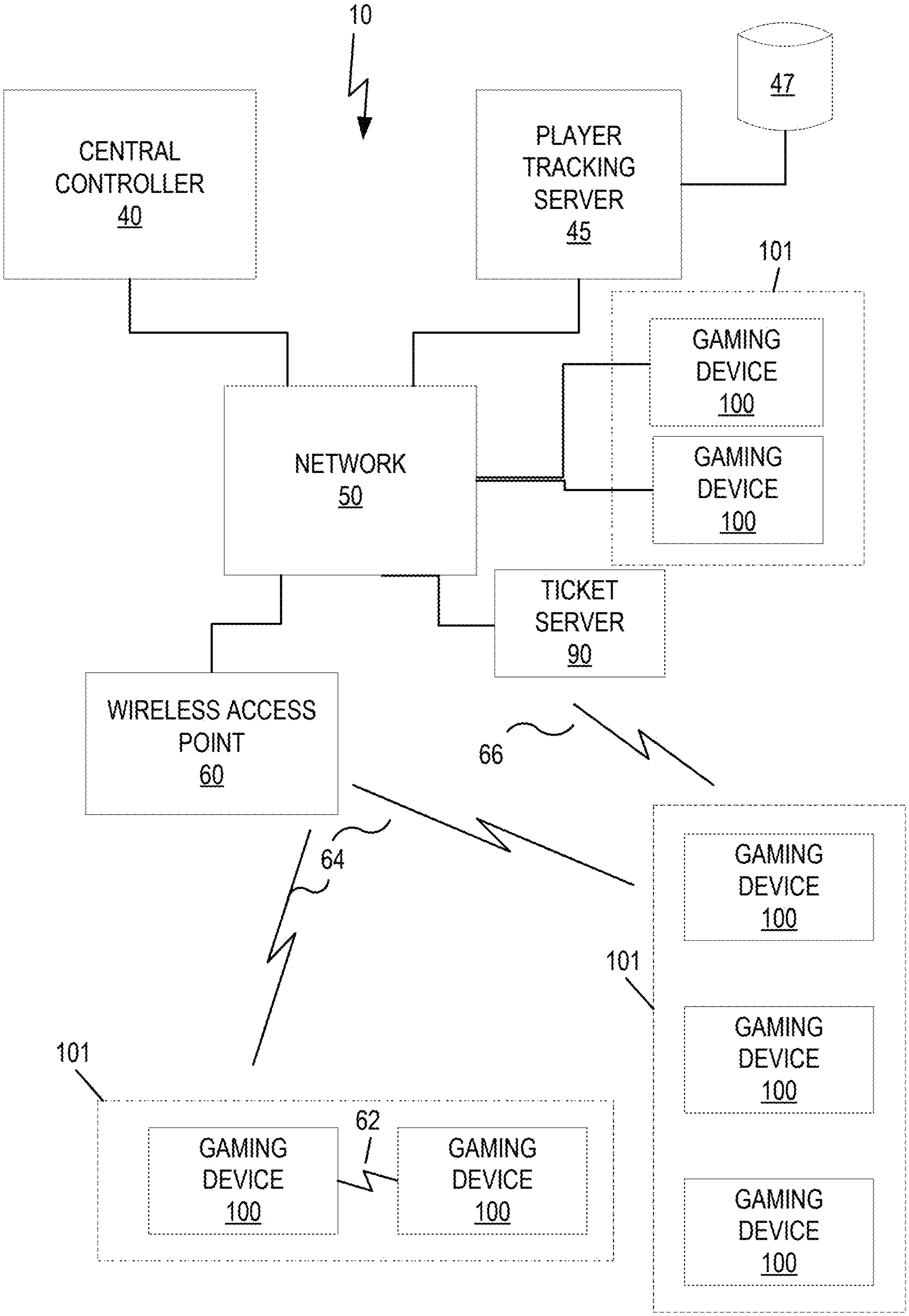
FIG. 1 is a schematic block diagram illustrating a network configuration for a plurality of gaming devices according to some embodiments.

Embodiments described herein relate to a shared virtual gaming environment, and in particular to providing a continuous game session between a real world gaming environment and a shared virtual gaming environment, and related devices, systems, and methods. In some embodiments, players in different locations may participate in tournaments together, across different gaming networks and/or channels (e.g., casino slot networks, video lottery terminal (VLT) networks, Internet, etc.). Tournaments may be single-player or team tournaments, which may be composed selectively (e.g., with players self-selecting friends or other group members), or randomly. Teams may compete against each other or collaborate, and may also compete against other teams.

Conventional gaming tournaments may be played online or locally (e.g., in a casino), but there is no mechanism for allowing players to play the same tournament across different channels. In some embodiments, an omni-channel tournament controller, which may be a network-connected server for hosting tournament play, may allow a tournament to be controlled and played by players at different locations, devices, networks, and/or channels. In some embodiments, the controller may also provide bonus games and/or awards, such as simultaneously trigger a community bonus across channels, providing a shared progressive, etc. In some embodiments, player progress and other information can be recorded and shared across different channels, such as by a shared user account connected to individual user accounts for different channels. Such information may be used to determine tournament eligibility, which may allow a player who would be ineligible based on progress on different individual channels to be eligible based on combined progress across multiple channels. A player that is invited to and/or unlocks a tournament entry may obtain a flag or other indicator in a shared player account, which can be used to indicate tournament eligibility on a different device, network, and/or channel at a later time.

Tournaments are good marketing tools for casinos and other venues, and are enjoyable attractive features for players. Embodiments described herein may allow venues to attract players from different player segments that may not participate in traditional destination-based gaming environments, and may encourage future play in different gaming channels.

In some examples, a player starts playing on one channel, such as a land based Electronic Gaming Machine (EGM) in a casino environment, a VLT environment, or on a personal computer or mobile device, which may unlock a subsequent level on a different channel. As players advance through different levels, larger jackpots may be unlocked. An omni-channel tournament could be organized in which players from different channels and different locations can participate in the same tournament, which may, in turn, attract attention as being more convenient for people to participate in competitions from a larger number and variety of devices and locations. In some examples, players can participate in these tournaments at specific times, during times of online connectivity, and/or selectively, such as using a tournament ID code or selecting a tournament option from an EGM, VLT, mobile device, etc.

Omni-channel tournaments may also be played with teams, which may be formed randomly or semi-randomly from different pools of players on the same or different server, location, region, and/or network. In some examples, a common progressive pot may be shared between the competing teams, with the winning team winning the pot. In some examples, the tournament may be based on each member of the team playing and winning on a different channel. In some examples, a relay tournament may allow a player winning on one channel to unlock the ability for the player or another player to play on another channel.

In some examples, tournament results and eligibility for different players can be tracked in a shared user account across all channels. The shared user account can be accessed from different type of devices as well as different channels. The shared user account may track a player's profile, access to various unlocked tournaments, information about associations such as possible pools that the player belongs to for shared experiences (such as friends, clans, guilds, etc.), play history, tournament placements, and/or player preferences, etc.

The omni-channel tournament controller and/or other devices in the system may communicate with devices on different channels via one or more wired or wireless network connections, e.g., using one or more network protocols to communicate with the various devices to coordinate the status of the game and progress of the player(s). The system may also support registering devices with a player's shared user account, creating and modifying user accounts, and/or setting and changing player preferences.

The omni-channel tournament controller and/or other devices in the system may also host and coordinate tournaments with user devices in different channels connected to the system. In some examples, a tournament can be started automatically or manually by an administrator or tournament manager. For example, after a tournament is set up and triggered, players may be invited to join the tournament through a notification system. After the players confirm that they are logged in and ready, the tournament may count down and begin. The system may send tournament status and user placement to user devices periodically during and after the tournament, to provide progress and results for the tournament to the different devices.

In some examples, cross-channel tournaments may include exclusive times, features, and/or awards for participating players, such as enabling tournament access from different channels for different players. In some examples, a bonus functionality may allow players to work together across channels toward a bonus award, such as at a predetermined time or triggered by a number of players playing at one time across different channels, e.g., with a minimum number of players on a minimum number of channels at one time, or with each player playing on a minimum number of channels during a predetermined time period. In some examples, the ability to play on different or specific channels may be provided as a perk, e.g., as a game award or loyalty bonus. For example, a player may participate in a tournament at a casino EGM and may receive a participation ticket when cashing out, which may include a code that may be scanned to register the player's participation and/or unlock the ability to continue to participate in the tournament on a different channel, which may be selected automatically or by the player. In some examples, players may compete against each other or may play cooperatively, with all members of a team receiving awards based on individual team member wins. In some examples, team members may pool resources to play a single game session together, with wins being redistributed among the contributing team members.

In some examples, players may unlock achievements through game play across different channels, which may unlock or be exchanged for tournament access, higher awards, more attractive games, improved paytables and/or odds, and/or other benefits.

In some examples, a tournament may require each player from a team to play from a different channel, with each new channel being unlocked after another player on a different channel achieves a predetermined number of plays, wins, etc. Teams may compete against each other to complete the tournament across all available channels first to win a grand prize. Play across channels may include the same game or multiple different games. In some examples, play in a tournament may be time-shifted, such that different players may begin the same tournament at different times in different locations (e.g., time zones) and/or channels (e.g., which may have different levels of network connectivity that may make simultaneous real-time participation impractical). For example, the tournament may include a multi-day period for each player to participate. In some examples, results from other players may remain hidden until everyone has finished their instance. Once completed, there might be notifications, a win celebration, a results announcement event, etc., at which point all the players can view everyone's results. In some examples, certain rounds, e.g., initial rounds, may be time shifted, with subsequent rounds being conducted in real-time. For example, later rounds in a tournament may have fewer remaining players competing for larger awards, which may make real-time participation more attractive and less inconvenient compared to earlier rounds where a larger number of initial entrants may be playing more casually.

Before discussing these and other embodiments in greater detail, reference will be made to an example of a gaming system for implementing embodiments disclosed herein. In this regard, FIG. 1 illustrates a gaming system 10 including a plurality of gaming devices 100 in different channels 101, such as a casino channel, a video lottery channel, an Internet-connected mobile device channel, a retail channel, etc. As discussed above, the gaming devices 100 may be one type of a variety of different types of gaming devices, such as EGMS, VLTs, mobile gaming devices, or other devices, for example. The gaming system 10 may be located, for example, on the premises of a gaming establishment, such as a casino. The gaming devices 100, which are typically situated on a casino floor, may be in communication with each other and/or at least one central controller 40 through a data communication network 50 that may include a remote communication link. The data communication network 50 may be a private data communication network that is operated, for example, by the gaming facility that operates the gaming devices 100. Communications over the data communication network 50 may be encrypted for security. The central controller 40 may be any suitable server or computing device which includes at least one processing circuit and at least one memory or storage device. Each gaming device 100 may include a processing circuit that transmits and receives events, messages, commands or any other suitable data or signal between the gaming device 100 and the central controller 40. The gaming device processing circuit is operable to execute such communicated events, messages or commands in conjunction with the operation of the gaming device 100. Moreover, the processing circuit of the central controller 40 is configured to transmit and receive events, messages, commands or any other suitable data or signal between the central controller 40 and each of the individual gaming devices 100. In some embodiments, one or more of the functions of the central controller 40 may be performed by one or more gaming device processing circuits. Moreover, in some embodiments, one or more of the functions of one or more gaming device processing circuits as disclosed herein may be performed by the central controller 40.

A wireless access point 60 provides wireless access to the data communication network 50. The wireless access point 60 may be connected to the data communication network 50 as illustrated in FIG. 1, and/or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 through the data communication network 50. Each ticket server 90 may include a processing circuit that transmits and receives events, messages, commands or any other suitable data or signal between the ticket server 90 and the central controller 40. The ticket server 90 processing circuit may be operable to execute such communicated events, messages or commands in conjunction with the operation of the ticket server 90. Moreover, in some embodiments, one or more of the functions of one or more ticket server 90 processing circuits as disclosed herein may be performed by the central controller 40.

The gaming devices 100 communicate with one or more elements of the gaming system 10 to coordinate providing wagering games and other functionality. For example, in some embodiments, the gaming device 100 may communicate directly with the ticket server 90 over a wireless interface 62, which may be a WiFi link, a Bluetooth link, a near field communications (NFC) link, etc. In other embodiments, the gaming device 100 may communicate with the data communication network 50 (and devices connected thereto, including other gaming devices 100) over a wireless interface 64 with the wireless access point 60. The wireless interface 64 may include a WiFi link, a Bluetooth link, an NFC link, etc. In still further embodiments, the gaming devices 100 may communicate simultaneously with both the ticket server 90 over the wireless interface 66 and the wireless access point 60 over the wireless interface 64. Some embodiments provide that gaming devices 100 may communicate with other gaming devices over a wireless interface 64. In these embodiments, wireless interface 62, wireless interface 64 and wireless interface 66 may use different communication protocols and/or different communication resources, such as different frequencies, time slots, spreading codes, etc.

Figure 2A:
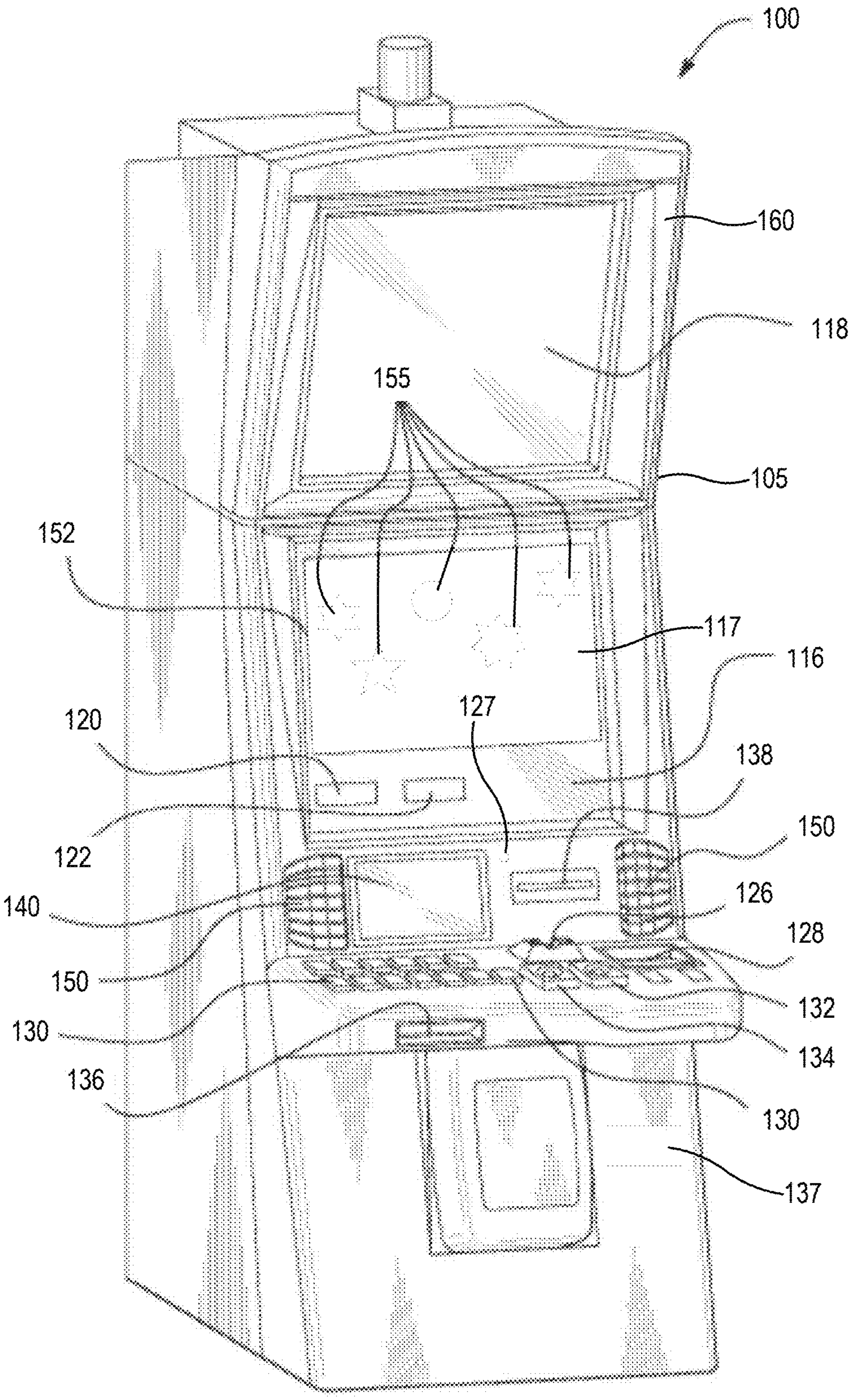
FIG. 2A is a perspective view of a gaming device that can be configured according to some embodiments.
Figure 2B:
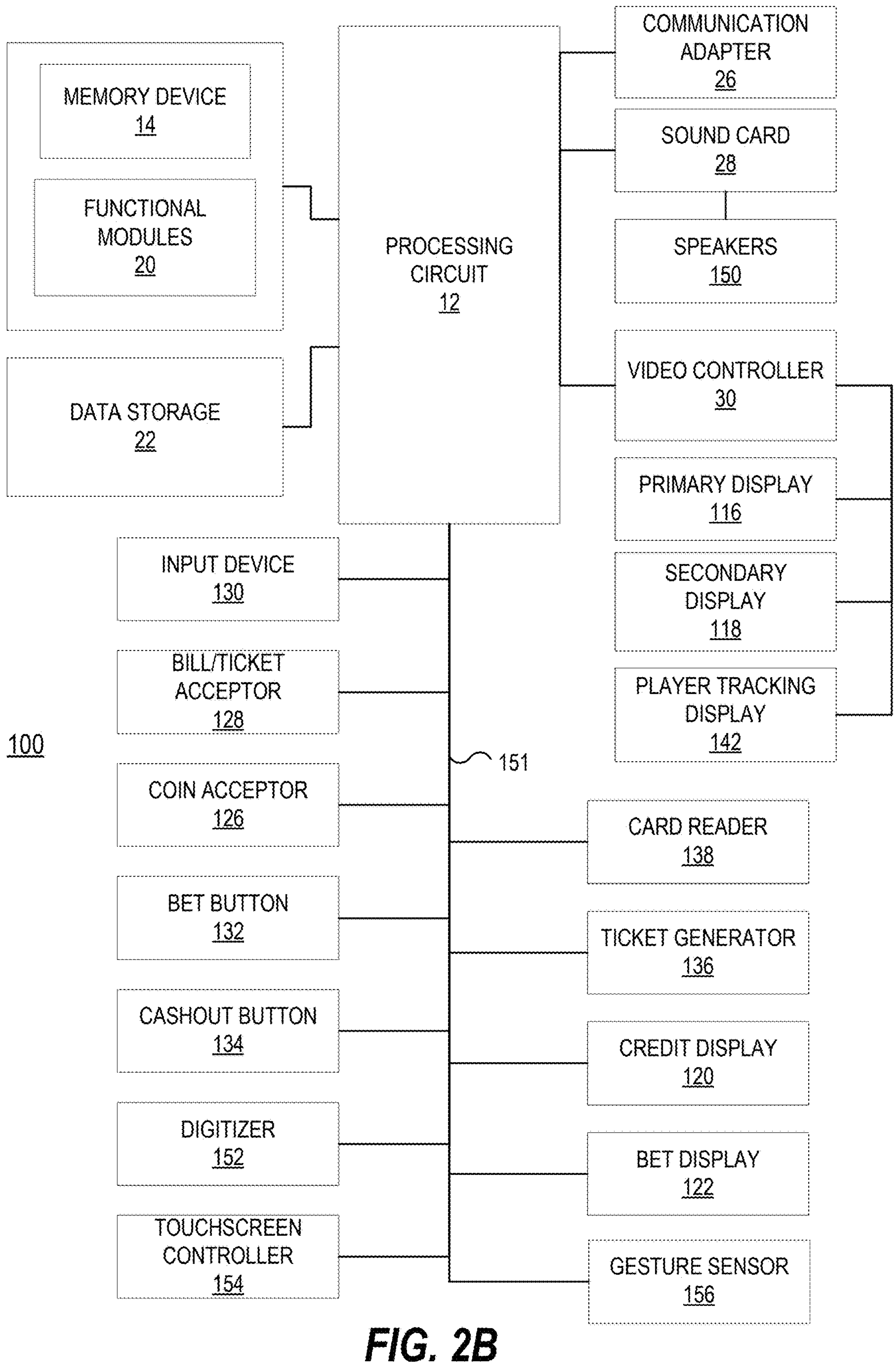
FIG. 2B is a schematic block diagram illustrating an electronic configuration for a gaming device according to some embodiments.
Figure 2C:
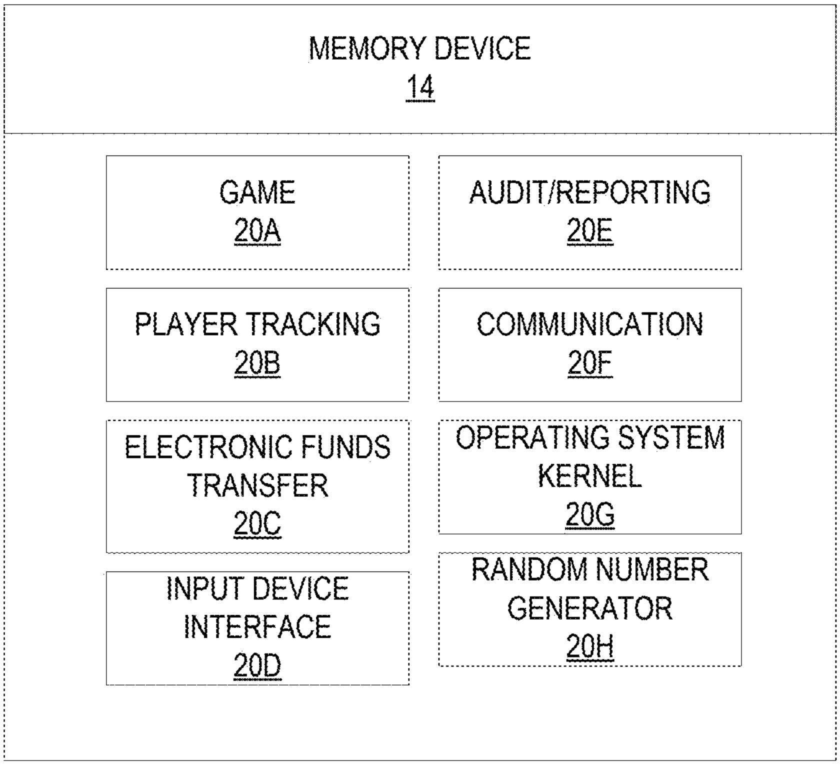
FIG. 2C is a schematic block diagram that illustrates various functional modules of a gaming device according to some embodiments.

Embodiments herein may include different types of gaming devices. One example of a gaming device includes a gaming device 100 that can use gesture and/or touch-based inputs according to various embodiments is illustrated in FIGS. 2A, 2B, and 2C in which FIG. 2A is a perspective view of a gaming device 100 illustrating various physical features of the device, FIG. 2B is a functional block diagram that schematically illustrates an electronic relationship of various elements of the gaming device 100, and FIG. 2C illustrates various functional modules that can be stored in a memory device of the gaming device 100. The embodiments shown in FIGS. 2A to 2C are provided as examples for illustrative purposes only. It will be appreciated that gaming devices may come in many different shapes, sizes, layouts, form factors, and configurations, and with varying numbers and types of input and output devices, and that embodiments are not limited to the particular gaming device structures described herein.

Gaming devices 100 typically include a number of standard features, many of which are illustrated in FIGS. 2A and 2B. For example, referring to FIG. 2A, a gaming device 100 (which is an EGM 160 in this embodiment) may include a support structure, housing 105 (e.g., cabinet) which provides support for a plurality of displays, inputs, outputs, controls and other features that enable a player to interact with the gaming device 100.

The gaming device 100 illustrated in FIG. 2A includes a number of display devices, including a primary display device 116 located in a central portion of the housing 105 and a secondary display device 118 located in an upper portion of the housing 105. A plurality of game components 155 are displayed on a display screen 117 of the primary display device 116. It will be appreciated that one or more of the display devices 116, 118 may be omitted, or that the display devices 116, 118 may be combined into a single display device. The gaming device 100 may further include a player tracking display 142, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the gaming device 100.

The player tracking display 142 may be used to display a service window that allows the player to interact with, for example, their player loyalty account to obtain features, bonuses, comps, etc. In other embodiments, additional display screens may be provided beyond those illustrated in FIG. 2A. In some embodiments, one or more of the player tracking display 142, the credit display 120 and the bet display 122 may be displayed in one or more portions of one or more other displays that display other game related visual content. For example, one or more of the player tracking display 142, the credit display 120 and the bet display 122 may be displayed in a picture in a picture on one or more displays.

The gaming device 100 may further include a number of input devices 130 that allow a player to provide various inputs to the gaming device 100, either before, during or after a game has been played. The gaming device may further include a game play initiation button 132 and a cashout button 134. The cashout button 134 is utilized to receive a cash payment or any other suitable form of payment corresponding to a quantity of remaining credits of a credit display.

In some embodiments, one or more input devices of the gaming device 100 are one or more game play activation devices that are each used to initiate a play of a game on the gaming device 100 or a sequence of events associated with the gaming device 100 following appropriate funding of the gaming device 100. The example gaming device 100 illustrated in FIGS. 2A and 2B includes a game play activation device in the form of a game play initiation button 132. It should be appreciated that, in other embodiments, the gaming device 100 begins game play automatically upon appropriate funding rather than upon utilization of the game play activation device.

In some embodiments, one or more input device 130 of the gaming device 100 may include wagering or betting functionality. For example, a maximum wagering or betting function may be provided that, when utilized, causes a maximum wager to be placed. Another such wagering or betting function is a repeat the bet device that, when utilized, causes the previously placed wager to be placed. A further such wagering or betting function is a bet one function. A bet is placed upon utilization of the bet one function. The bet is increased by one credit each time the bet one device is utilized. Upon the utilization of the bet one function, a quantity of credits shown in a credit display (as described below) decreases by one, and a number of credits shown in a bet display (as described below) increases by one.

In some embodiments, as shown in FIG. 2B, the input device(s) 130 may include and/or interact with additional components, such as gesture sensors 156 for gesture input devices, and/or a touch-sensitive display that includes a digitizer 152 and a touchscreen controller 154 for touch input devices, as disclosed herein. The player may interact with the gaming device 100 by touching virtual buttons on one or more of the display devices 116, 118, 140. Accordingly, any of the above-described input devices, such as the input device 130, the game play initiation button 132 and/or the cashout button 134 may be provided as virtual buttons or regions on one or more of the display devices 116, 118, 140.

Referring briefly to FIG. 2B, operation of the primary display device 116, the secondary display device 118 and the player tracking display 142 may be controlled by a video controller 30 that receives video data from a processing circuit 12 or directly from a memory device 14 and displays the video data on the display screen. The credit display 120 and the bet display 122 are typically implemented as simple liquid crystal display (LCD) or light emitting diode (LED) displays that display a number of credits available for wagering and a number of credits being wagered on a particular game. Accordingly, the credit display 120 and the bet display 122 may be driven directly by the processing circuit 12. In some embodiments however, the credit display 120 and/or the bet display 122 may be driven by the video controller 30.

Referring again to FIG. 2A, the display devices 116, 118, 140 may include, without limitation: a cathode ray tube, a plasma display, an LCD, a display based on LEDs, a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touchscreen with an associated touchscreen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the gaming device 100 are generally configured to display one or more game and/or non-game images, symbols, and indicia. In certain embodiments, the display devices 116, 118, 140 of the gaming device 100 are configured to display any suitable visual representation or exhibition of the movement of objects; dynamic lighting; video images; images of people, characters, places, things, and faces of cards; and the like. In certain embodiments, the display devices 116, 118, 140 of the gaming device 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The gaming device 100 also includes various features that enable a player to deposit credits in the gaming device 100 and withdraw credits from the gaming device 100, such as in the form of a payout of winnings, credits, etc. For example, the gaming device 100 may include a bill/ticket dispenser 136, a bill/ticket acceptor 128, and a coin acceptor 126 that allows the player to deposit coins into the gaming device 100.

As illustrated in FIG. 2A, the gaming device 100 may also include a currency dispenser 137 that may include a note dispenser configured to dispense paper currency and/or a coin generator configured to dispense coins or tokens in a coin payout tray.

The gaming device 100 may further include one or more speakers 150 controlled by one or more sound cards 28 (FIG. 2B). The gaming device 100 illustrated in FIG. 2A includes a pair of speakers 150. In other embodiments, additional speakers, such as surround sound speakers, may be provided within or on the housing 105. Moreover, the gaming device 100 may include built-in seating with integrated headrest speakers.

In various embodiments, the gaming device 100 may generate dynamic sounds coupled with attractive multimedia images displayed on one or more of the display devices 116, 118, 140 to provide an audio-visual representation or to otherwise display full-motion video with sound to attract players to the gaming device 100 and/or to engage the player during gameplay. In certain embodiments, the gaming device 100 may display a sequence of audio and/or visual attraction messages during idle periods to attract potential players to the gaming device 100. The videos may be customized to provide any appropriate information.

The gaming device 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processing circuit determines the amount of funds entered and displays the corresponding amount on the credit or other suitable display as described above.

In some embodiments, the gaming device 100 may include an electronic payout device or module configured to fund an electronically recordable identification card or smart card or a bank or other account via an electronic funds transfer to or from the gaming device 100.

FIG. 2B is a block diagram that illustrates logical and functional relationships between various components of a gaming device 100. It should also be understood that components described in FIG. 2B may also be used in other computing devices, as desired, such as mobile computing devices for example. As shown in FIG. 2B, the gaming device 100 may include a processing circuit 12 that controls operations of the gaming device 100. Although illustrated as a single processing circuit, multiple special purpose and/or general purpose processors and/or processor cores may be provided in the gaming device 100. For example, the gaming device 100 may include one or more of a video processor, a signal processor, a sound processor and/or a communication controller that performs one or more control functions within the gaming device 100. The processing circuit 12 may be variously referred to as a "controller," "microcontroller," "microprocessor" or simply a "computer." The processor may further include one or more application-specific integrated circuits (ASICs).

Various components of the gaming device 100 are illustrated in FIG. 2B as being connected to the processing circuit 12. It will be appreciated that the components may be connected to the processing circuit 12 through a system bus 151, a communication bus and controller, such as a universal serial bus (USB) controller and USB bus, a network interface, or any other suitable type of connection.

The gaming device 100 further includes a memory device 14 that stores one or more functional modules 20. Various functional modules 20 of the gaming device 100 will be described in more detail below in connection with FIG. 2D.

The memory device 14 may store program code and instructions, executable by the processing circuit 12, to control the gaming device 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The gaming device 100 may further include a data storage 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, Digital Video Disc ("DVD") or USB memory device.

The gaming device 100 may include a communication adapter 26 that enables the gaming device 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or NFC that enable the gaming device 100 to communicate, for example, with a mobile communication device operated by a player.

The gaming device 100 may include one or more internal or external communication ports that enable the processing circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, Small Computer System Interface ("SCSI") ports, solenoids, speakers, thumb drives, ticket readers, touch screens, trackballs, touchpads, wheels, and wireless communication devices. In some embodiments, internal or external peripheral devices may communicate with the processing circuit through a USB hub (not shown) connected to the processing circuit 12.

In some embodiments, the gaming device 100 may include a sensor, such as a camera 127, in communication with the processing circuit 12 (and possibly controlled by the processing circuit 12) that is selectively positioned to acquire an image of a player actively using the gaming device 100 and/or the surrounding area of the gaming device 100. In one embodiment, the camera 127 may be configured to selectively acquire still or moving (e.g., video) images and may be configured to acquire the images in either an analog, digital or other suitable format. The display devices 116, 118, 140 may be configured to display the image acquired by the camera 127 as well as display the visible manifestation of the game in split screen or picture-in-picture fashion. For example, the camera 127 may acquire an image of the player and the processing circuit 12 may incorporate that image into the primary and/or secondary game as a game image, symbol or indicia.

Various functional modules of that may be stored in a memory device 14 of a gaming device 100 are illustrated in FIG. 2C. Referring to FIG. 2C, the gaming device 100 may include in the memory device 14 a game module 20A that includes program instructions and/or data for operating a hybrid wagering game as described herein. The gaming device 100 may further include a player tracking module 20B, an electronic funds transfer module 20C, an input device interface 20D, an audit/reporting module 20E, a communication module 20F, an operating system kernel 20G and a random number generator 20H. The player tracking module 20B keeps track of the play of a player. The electronic funds transfer module 20C communicates with a back end server or financial institution to transfer funds to and from an account associated with the player. The input device interface 20D interacts with input devices, such as the input device 130, as described in more detail below. The communication module 20F enables the gaming device 100 to communicate with remote servers and other gaming devices using various secure communication interfaces. The operating system kernel 20G controls the overall operation of the gaming device 100, including the loading and operation of other modules. The random number generator 20H generates random or pseudorandom numbers for use in the operation of the hybrid games described herein.

In some embodiments, a gaming device 100 includes a personal device, such as a desktop computer, a laptop computer, a mobile device, a tablet computer or computing device, a personal digital assistant (PDA), or other portable computing devices. In some embodiments, the gaming device 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 2D:
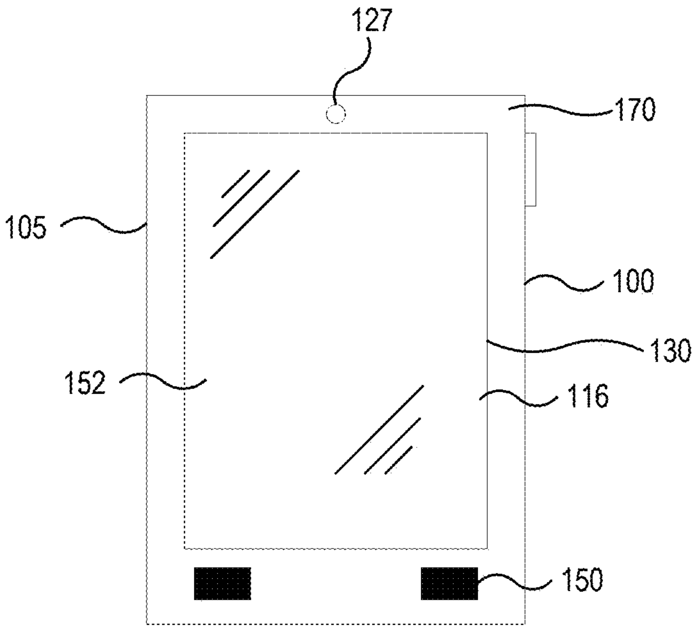
FIG. 2D is perspective view of a gaming device that can be configured according to some embodiments.

For example, referring to FIG. 2D, a gaming device 100 (which is a mobile gaming device 170 in this embodiment) may be implemented as a handheld device including a compact housing 105 on which is mounted a touchscreen display device 116 including a digitizer 152. One or more input devices 130 may be included for providing functionality of for embodiments described herein. A camera 127 may be provided in a front face of the housing 105. The housing 105 may include one or more speakers 150. In the gaming device 100, various input buttons described above, such as the cashout button, gameplay activation button, etc., may be implemented as soft buttons on the touchscreen display device 116 and/or input device 130. In this embodiment, the input device 130 is integrated into the touchscreen display device 116, but it should be understood that the input device may also, or alternatively, be separate from the display device 116. Moreover, the gaming device 100 may omit certain features, such as a bill acceptor, a ticket generator, a coin acceptor or dispenser, a card reader, secondary displays, a bet display, a credit display, etc. Credits can be deposited in or transferred from the gaming device 100 electronically.

Figure 2E:
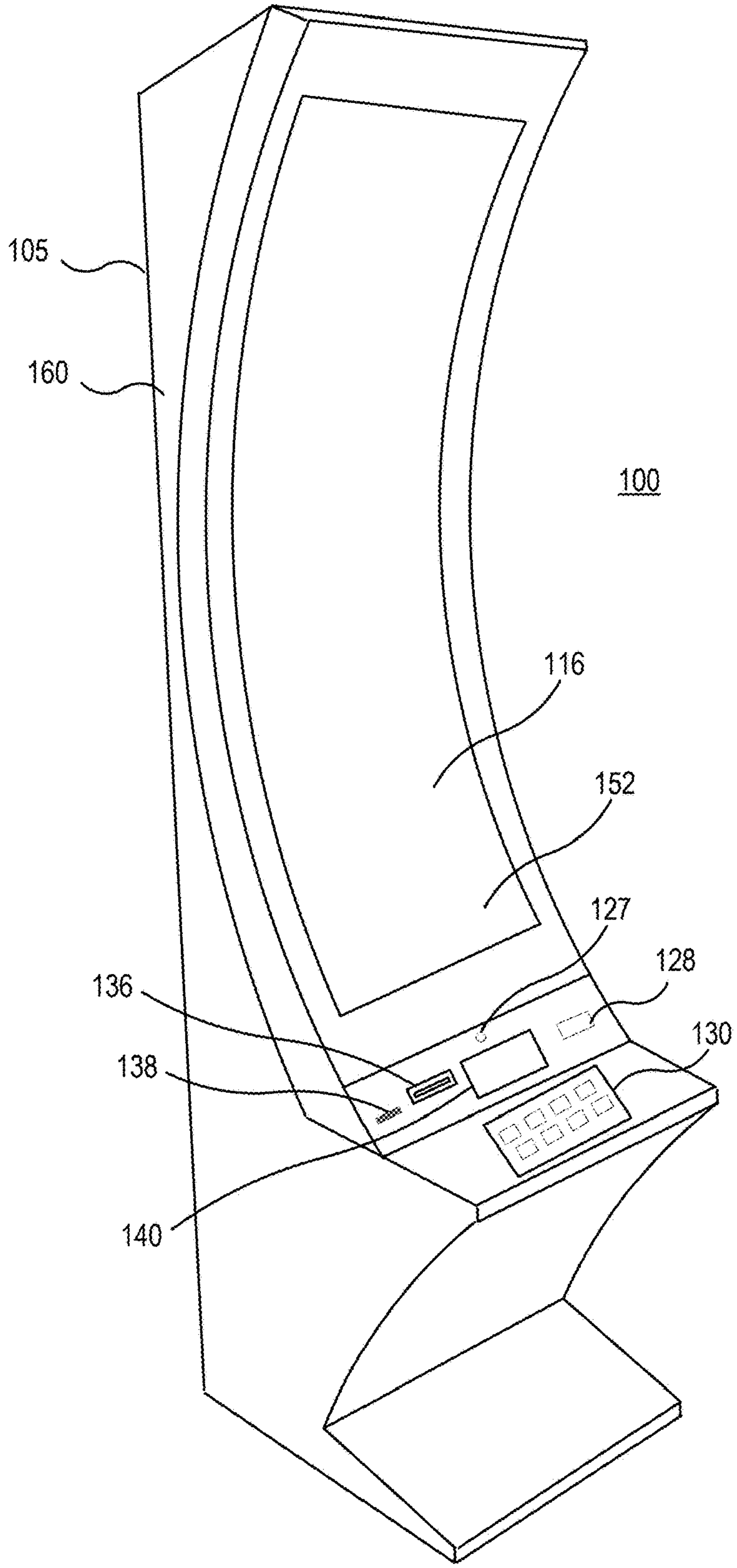
FIG. 2E is a perspective view of a gaming device according to further embodiments.

FIG. 2E illustrates a standalone gaming device 100 (which is an EGM 160 in this embodiment) having a different form factor from the EGM 160 illustrated in FIG. 2A. In particular, the gaming device 100 is characterized by having a large, high aspect ratio, curved primary display device 116 provided in the housing 105, with no secondary display device. The primary display device 116 may include a digitizer 152 to allow touchscreen interaction with the primary display device 116. The gaming device 100 may further include a player tracking display 142, an input device 130, a bill/ticket acceptor 128, a card reader 138, and a bill/ticket dispenser 136. The gaming device 100 may further include one or more cameras 127 to enable facial recognition and/or motion tracking.

Although illustrated as certain gaming devices, such as electronic gaming machines (EGMs), mobile gaming devices, VR/AR headsets, etc., functions and/or operations as described herein may also include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, gaming devices according to embodiments herein may be implemented using other computing devices and mobile devices, such as smart phones, tablets, and/or personal computers, among others.

Figure 3A:
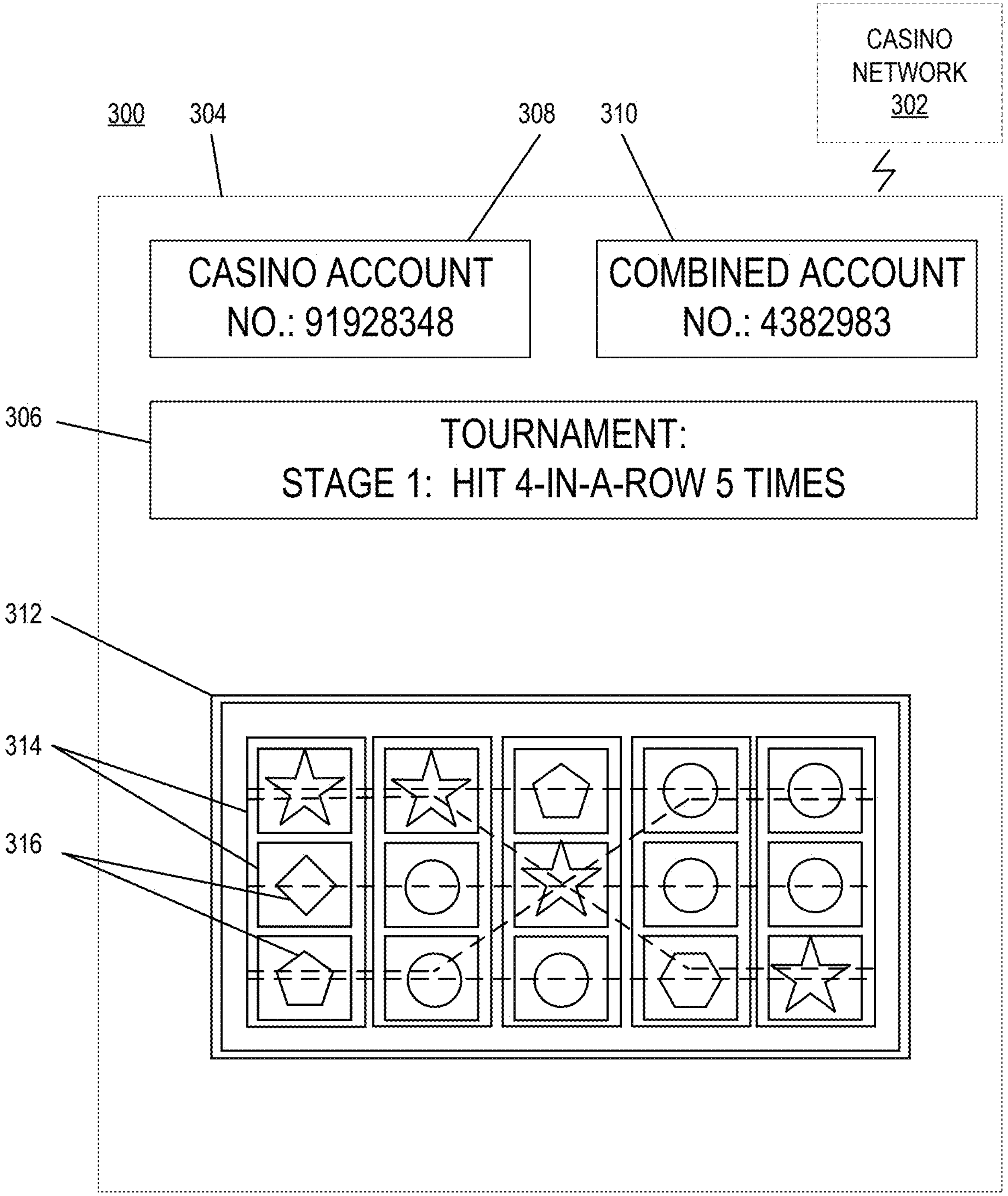
FIGS. 3A-3C illustrate a wagering game tournament being played by a player across different devices and platforms, according to some embodiments.
Figure 3B:
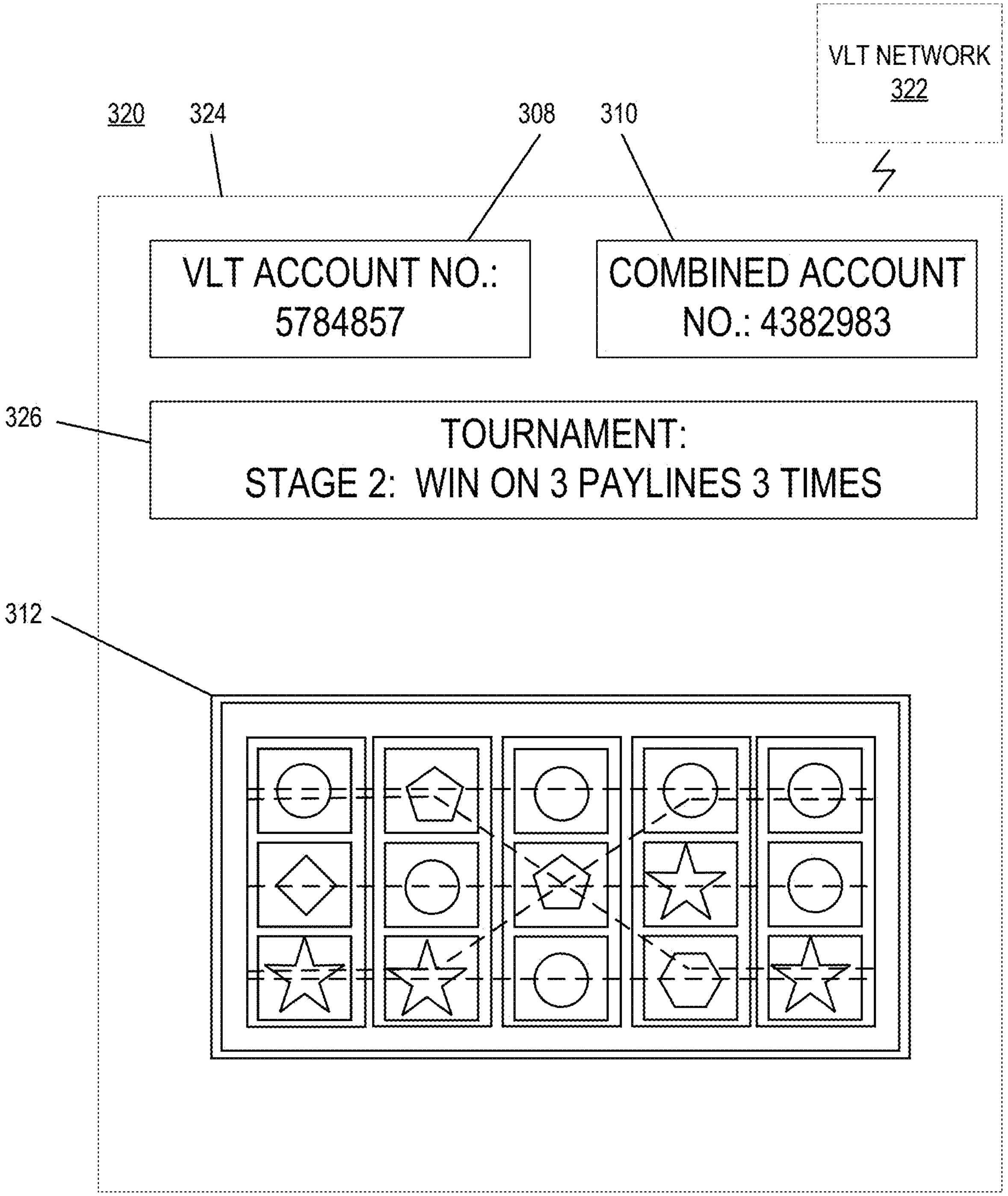
Figure 3C:
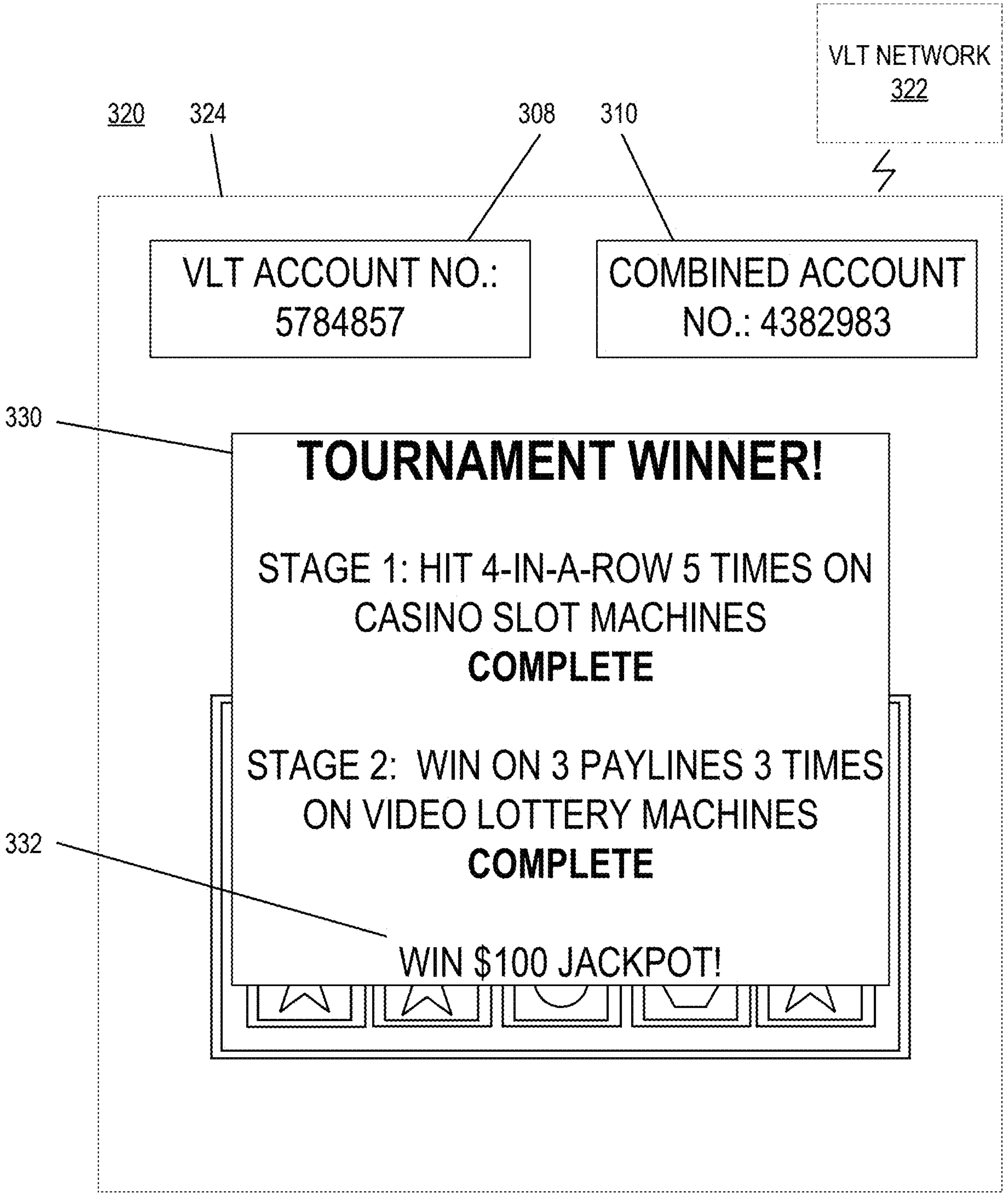

FIGS. 3A-3C illustrate a wagering game tournament being played by a player across different devices and platforms, according to some embodiments. As shown by FIG. 3A, an EGM 300 connected to an EGM casino network 302 includes a graphical user interface (GUI) 304 for providing a wagering game tournament that includes game elements 314 for play of a wagering game 312 including a plurality of game symbols 316. In this example, the wagering game 312 is a slot-style game, but it should be understood that any type of wagering game may be provided in this and other tournament formats.

A first tournament entry 306 for the wagering game tournament is received via the EGM 300, which may include play of the wagering game 312. The GUI 304 may also include an indication of an EGM player account 308 associated with the player that is operable on the EGM casino network 302. The GUI 304 may also include an indication of a combined player account 310 associated with the player and linking the EGM player account 308 to other accounts associated with the player on other platforms.

As shown by FIG. 3B, a second tournament entry 326 for the wagering game tournament is received via a Video Lottery Terminal (VLT) device 320 on a VLT lottery network 322 separate from the EGM casino network 302. It should also be understood that while the second tournament entry 326 is received via a VLT device 320 in this example, other devices, networks, and/or channels may be used, such as a personal and/or mobile computing device on an Internet-connected network, for example.

The second tournament entry 326 may include continued play of the wagering game 312 (or another wagering game, as desired), on a GUI 324 of the VLT device 320. In this example, receipt of the second tournament entry 326 may be enabled only after receipt of the first tournament entry 306, i.e., with the second tournament entry 326 at the VLT device 320 being unlocked by play of the wagering game 312 at the EGM 300, for example. The GUI 324 may also include an indication of VLT player account 328 associated with the player that is operable on the VLT lottery network 302, and may also include an indication of the combined player account 310 associated with the player and linking the VLT player account 328 to other accounts associated with the player on other platforms, such as the EGM player account 308 for example. In this example, the combined player account is associated with a combined player account system that is separate from the EGM casino network 302 and the VLT lottery network 322.

As shown by FIG. 3C, a game result 330 for the wagering game tournament is determined based on the first tournament entry 306 and the second tournament entry 326. An indication of the game result 330 is provided via a GUI of a device being accessed by the player (the GUI 324 of the VLT device 320 in this example), but it should be understood that any network connected device may provide an indication of the game result 330, as desired. In response to the game result 330 being a winning game result, a game award 332 may be provided to the associated player.

Figure 4A:
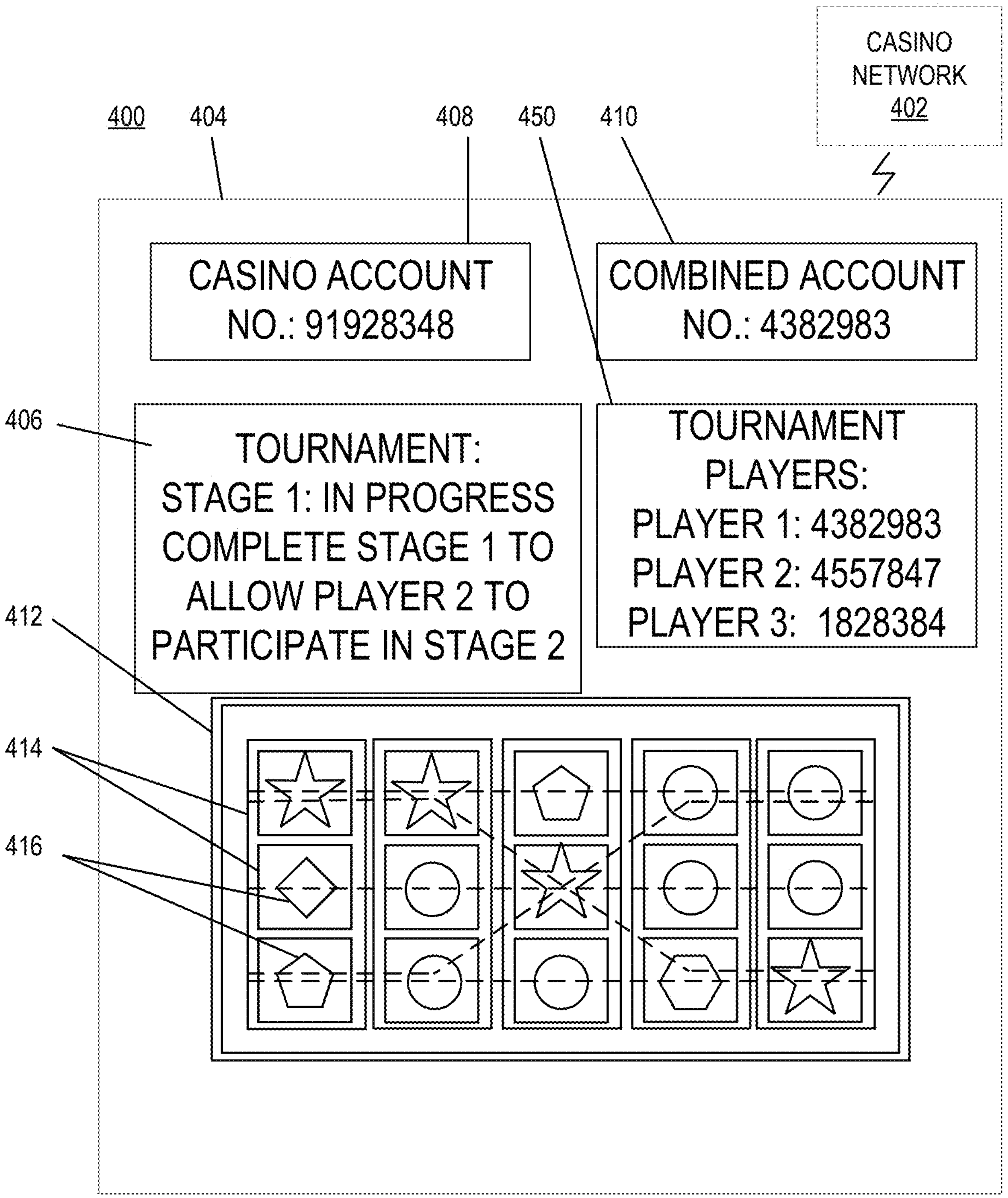
FIGS. 4A and 4B illustrate a wagering game tournament being played by different players across different devices and platforms, according to some embodiments.
Figure 4B:
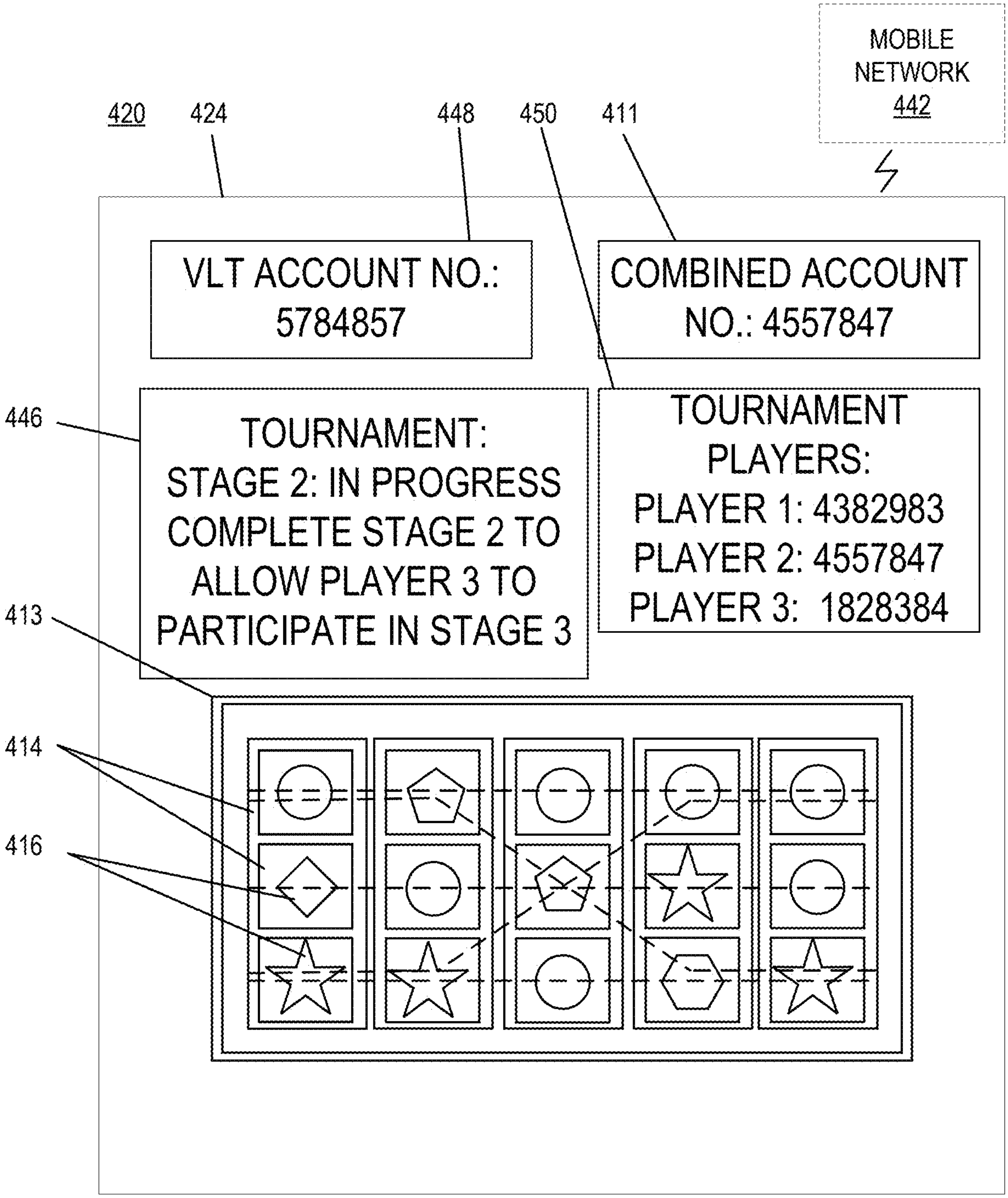

In another example, multiple players can participate in a tournament across different channels, such as in a "relay"-style tournament. In this regard, FIGS. 4A and 4B illustrate a wagering game tournament being played by different players across different devices and platforms, according to some embodiments. As shown by FIG. 4A, an EGM 400 connected to an EGM casino network 402 includes a graphical user interface (GUI) 404 for providing a wagering game tournament that includes game elements 414 for play of a wagering game 412 including a plurality of game symbols 416. A first tournament entry 406 for the wagering game tournament is received via the EGM 400, which may include play of the wagering game 412 by a first player. The GUI 404 may also include an indication of an EGM player account 408 associated with the first player that is operable on the EGM casino network 402 and may also include an indication of a combined player account 410 associated with the first player and linking the EGM player account 408 to other accounts associated with the first player on other platforms. The GUI 403 may also include an indication of combined player accounts associated with other players participating in the tournament, including a combined player account 411 associated with a second player playing on a device in a different channel.

In this regard, FIG. 4B illustrates a second tournament entry 426 for the wagering game tournament being received via a mobile computing device 440 on Internet-connected network 442 separate from the EGM casino network 402. The GUI 424 includes an indication of another wagering game 413 and may also include an indication of a mobile player account 448 associated with the second player playing the wagering game 413 as part of the tournament. The mobile player account 448 is operable on Internet-connected network 442 and the GUI 444 may also include an indication of the combined player account 411 associated with the second player and linking the mobile player account 448 to other accounts associated with the second player on other platforms. The GUI 403 may also include an indication 450 of combined player accounts associated with other players participating in the tournament, including the combined player account 410 associated with the first player playing on the EGM 400.

Figure 5:
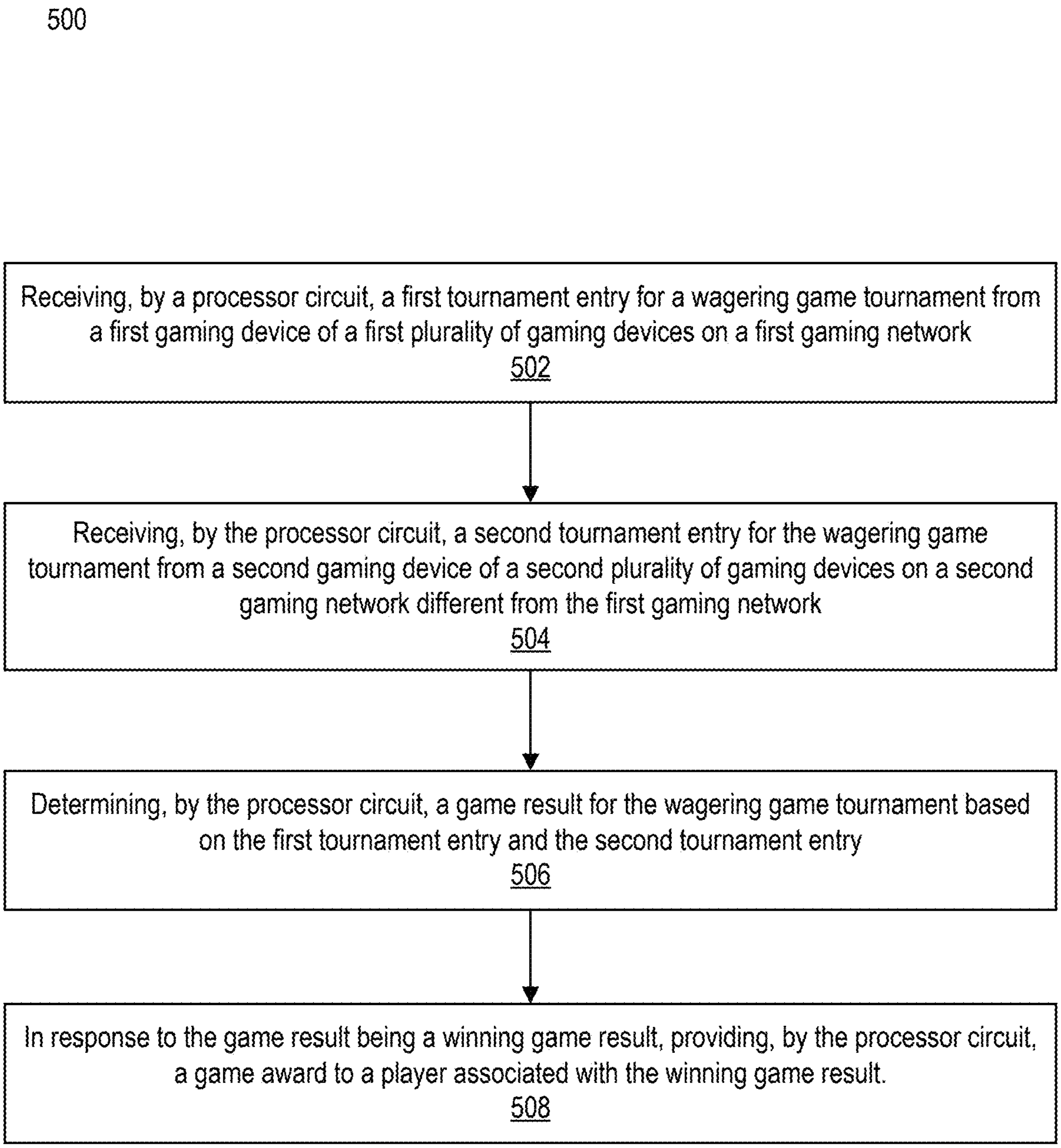
FIG. 5 is a flowchart illustrating operations of systems/methods for facilitating embodiments described herein, according to some embodiments.

FIG. 5 is a flowchart illustrating operations 500 of systems/methods for facilitating embodiments described herein. The operations 500 may be performed by one or more processor circuits of one or more computing devices, such as any of the computing devices described herein, for example. The operations 500 may include receiving, by a processor circuit, a first tournament entry for a wagering game tournament from a first gaming device of a first plurality of gaming devices on a first gaming network (Block 502). The operations 500 may further include receiving, by the processor circuit, a second tournament entry for the wagering game tournament from a second gaming device of a second plurality of gaming devices on a second gaming network different from the first gaming network (Block 504). The operations 500 may further include determining, by the processor circuit, a game result for the wagering game tournament based on the first tournament entry and the second tournament entry. (Block 506). The operations 500 may further include, in response to the game result being a winning game result, providing, by the processor circuit, a game award to a player associated with the winning game result (Block 508).

Embodiments described herein may be implemented in various configurations for gaming devices 100, including but not limited to: (1) a dedicated gaming device, wherein the computerized instructions for controlling any games (which are provided by the gaming device) are provided with the gaming device prior to delivery to a gaming establishment; and (2) a changeable gaming device, where the computerized instructions for controlling any games (which are provided by the gaming device) are downloadable to the gaming device through a data network when the gaming device is in a gaming establishment. In some embodiments, the computerized instructions for controlling any games are executed by at least one central server, central controller or remote host. In such a "thin client" embodiment, the central server remotely controls any games (or other suitable interfaces), and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In some embodiments, a gaming device may be operated by a mobile device, such as a mobile telephone, tablet or other mobile computing device. For example, a mobile device may be communicatively coupled to a gaming device and may include a user interface that receives user inputs that are received to control the gaming device. The user inputs may be received by the gaming device via the mobile device.

In some embodiments, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more gaming devices; and/or (c) one or more personal gaming devices, such as desktop computers, laptop computers, tablet computers or computing devices, PDAs, mobile telephones such as smart phones, and other mobile computing devices.

In certain such embodiments, computerized instructions for controlling any games (such as any primary or base games and/or any secondary or bonus games) displayed by the gaming device are executed by the central server, central controller, or remote host. In such "thin client" embodiments, the central server, central controller, or remote host remotely controls any games (or other suitable interfaces) displayed by the gaming device, and the gaming device is utilized to display such games (or suitable interfaces) and to receive one or more inputs or commands. In other such embodiments, computerized instructions for controlling any games displayed by the gaming device are communicated from the central server, central controller, or remote host to the gaming device and are stored in at least one memory device of the gaming device. In such "thick client" embodiments, the at least one processor of the gaming device executes the computerized instructions to control any games (or other suitable interfaces) displayed by the gaming device.

In some embodiments in which the gaming system includes: (a) a gaming device configured to communicate with a central server, central controller, or remote host through a data network; and/or (b) a plurality of gaming devices configured to communicate with one another through a data network, the data network is an internet or an intranet. In certain such embodiments, an internet browser of the gaming device is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the gaming device, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the gaming device.

It should be appreciated that the central server, central controller, or remote host and the gaming device are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of gaming devices to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

In the above description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product including one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, radio frequency ("RF"), etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, Common Business Oriented Language ("COBOL") 2002, PHP: Hypertext Processor ("PHP"), Advanced Business Application Programming ("ABAP"), dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (Saas).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processing circuit of a general purpose computer, special purpose computer, or other programmable data processing apparatus to produce a machine, such that the instructions, which execute via the processing circuit of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operations to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A system comprising:

an electronic gaming machine located in a casino and connected to a first gaming network;

a mobile device located remotely from the casino and connected to a second gaming network different from the first gaming network;

an omni-channel tournament controller;

a processor circuit; and a memory coupled to the processor circuit, the memory comprising machine-readable instructions that, when executed by the processor circuit, cause the processor circuit to:

receive, from the omni-channel tournament controller via a network, a request to participate in a wagering game tournament from the electronic gaming machine;

determine eligibility for the electronic gaming machine to participate in the wagering game tournament based on a player account associated with a player of the electronic gaming machine;

after determining the electronic gaming machine is eligible to participate in the wagering game tournament, receive a first tournament entry for the wagering game tournament from a first the electronic gaming device via the omni-channel tournament controller;

receive a second tournament entry for the wagering game tournament from a second gaming the mobile device via the omni-channel tournament controller;

determine in real-time while the electronic gaming device and the mobile device remain connected to the omni-channel tournament controller, a game result for the wagering game tournament based on the first tournament entry and the second tournament entry; and in response to the game result being a winning game result for the electronic gaming device, provide a game award to a player the electronic gaming device associated with the winning game result.

2. The system of claim 1, wherein the first tournament entry is associated with a first player and wherein the second tournament entry is associated with the first player.

3. The system of claim 2, wherein receipt of the second tournament entry is enabled only after receipt of the first tournament entry.

4. The system of claim 1, wherein the first tournament entry is associated with a first player and wherein the second tournament entry is associated with a second player.

5. The system of claim 1, wherein the first gaming network comprises a plurality of electronic gaming machines (EGMs) on an EGM casino network, and wherein the second gaming network comprises gaming devices located outside the EGM casino network.

6. The system of claim 5, wherein the gaming devices on the second gaming network are a plurality of computing devices on an Internet-connected network.

7. The system of claim 5, wherein the gaming devices on the second gaming network are a plurality of video lottery terminals (VLTs) on a VLT lottery network.

8. The system of claim 1, wherein the gaming devices on the second gaming network is a plurality of video lottery terminals (VLTs) on a VLT lottery network, and wherein the gaming devices on the second gaming network are located outside the VLT lottery network.

9. The system of claim 8, wherein the gaming devices on the second gaming network are a plurality of computing devices on an Internet-connected network.

10. The system of claim 8, wherein the gaming devices on the second gaming network are a plurality of electronic gaming machines (EGMs) on a second EGM casino network.

11. The system of claim 1, wherein the gaming devices on the second gaming network are a plurality of computing devices on an Internet-connected network, and wherein the gaming devices on the second gaming network are located outside the Internet-connected network.

12. The system of claim 11, wherein the plurality of computing devices comprises a plurality of mobile computing devices.

13. The system of claim 1, wherein the first tournament entry is associated with a first player account on a first player account system, and wherein the second tournament entry is associated with a second player account on a second player account system different from the first player account system.

14. The system of claim 13, wherein the first player account is associated with a first combined account on a third combined player account system, and wherein the second player account is associated with a second combined account on the third combined player account system.

15. A system comprising:

a mobile device located remotely from a casino and connected to a first gaming network;

an electronic gaming device located in the casino and connected to a second gaming network different from the first gaming network;

an omni channel tournament controller;

a processor circuit; and a memory coupled to the processor circuit, the memory comprising machine-readable instructions that, when executed by the processor circuit, cause the processor circuit to:

receive, from the omni-channel tournament controller via a network, a request to participate in a wagering game tournament from the mobile device;

determine eligibility for the mobile device to participate in the wagering game tournament based on a player account associated with a player of the mobile device;

after determining the mobile device is eligible to participate in the wagering game tournament, receive a first tournament entry for the wagering game tournament from the mobile device via the omni-channel tournament controller;

receive a second tournament entry for the wagering game tournament from the electronic gaming device via the omni-channel tournament controller;

determine in real-time while the electronic gaming device and the mobile device remain connected to the omni-channel tournament controller a game result for the wagering game tournament based on the first tournament entry and the second tournament entry; and in response to the game result being a winning game result for the mobile device, provide a game award to the mobile device associated with the winning game result.

16. The system of claim 15, wherein the first tournament entry is associated with a first player and wherein the second tournament entry is associated with the first player.

17. The system of claim 16, wherein receipt of the second tournament entry is enabled only after receipt of the first tournament entry.

18. The system of claim 17, wherein the first tournament entry is associated with a first player and wherein the second tournament entry is associated with a second player.

19. A method comprising:

receiving, by a processor circuit from an omni-channel tournament controller via a network, a request to participate in a wagering game tournament from an electronic gaming machine located in a casino;

determining, by a processor circuit, eligibility for the electronic gaming machine to participate in the wagering game tournament based on a player account associated with a player of the electronic gaming machine;

after determining the electronic gaming machine is eligible to participate in the wagering game tournament, receiving, by the processor circuit, a first tournament entry for the wagering game tournament from the electronic gaming device via the omni-channel tournament controller;

receiving, by the processor circuit, a second tournament entry for the wagering game tournament from a mobile device located remotely from the casino via the omni-channel tournament controller;

determining, by the processor circuit in real-time while the electronic gaming device and the mobile device remain connected to the omni-channel tournament controller, a game result for the wagering game tournament based on the first tournament entry and the second tournament entry; and in response to the game result being a winning game result for the electronic gaming device, providing, by the processor circuit, a game award to the electronic gaming device associated with the winning game result.

20. The method of claim 19, wherein receipt of the second tournament entry is enabled only after receipt of the first tournament entry.

* * * * *